(12) United States Patent
Xiao et al.

(10) Patent No.: US 6,625,463 B1
(45) Date of Patent: Sep. 23, 2003

(54) SYNCHRONIZATION OF SUPER FRAMES IN AN INTEGRATED SERVICES DIGITAL BROADCASTING FOR SATELLITES ISDB-S SYSTEM

(75) Inventors: Chusong Xiao, San Jose, CA (US); Bo Lu, San Jose, CA (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/470,004

(22) Filed: Dec. 22, 1999

(51) Int. Cl.[7] ............................................. H04B 7/216
(52) U.S. Cl. ...................... 455/502; 455/13.2; 455/503; 370/324; 370/310; 370/503; 375/354
(58) Field of Search ................................ 370/509, 510, 370/511–512, 514, 513, 366, 335, 347, 350, 329–334, 342, 508; 455/63, 67.3, 69, 103, 450, 522, 427, 428, 434, 453, 507, 509, 43.2; 375/293, 354, 365–366, 149

(56) References Cited

U.S. PATENT DOCUMENTS

| | | | | | |
|---|---|---|---|---|---|
| 4,398,291 | A | * | 8/1983 | Hotta et al. .................. | 370/323 |
| 4,847,877 | A | * | 7/1989 | Besseyre .................. | 340/146.2 |
| 5,646,947 | A | * | 7/1997 | Cooper et al. ............... | 370/510 |
| 5,740,168 | A | * | 4/1998 | Nakamura et al. .......... | 370/347 |
| 5,982,761 | A | * | 11/1999 | Dutta .......................... | 370/337 |
| 5,991,279 | A | * | 11/1999 | Haugli et al. ............... | 340/7.34 |
| 6,195,402 | B1 | * | 2/2001 | Hiramatsu ................... | 375/343 |
| 6,204,725 | B1 | * | 3/2001 | Ohishi ......................... | 239/308 |
| 6,341,125 | B1 | * | 1/2002 | Hong et al. ................. | 370/335 |

* cited by examiner

*Primary Examiner*—Pablo N Tran
(74) *Attorney, Agent, or Firm*—Christopher P. Maiorana, PC

(57) ABSTRACT

An apparatus comprising a first circuit and a second circuit. The first circuit may be configured to generate a first detection signal and a second detection signal in response to (i) an input signal, (ii) a first control signal, and (iii) a second control signal. The second circuit may be configured to generate a first output signal and a second output signal in response to (i) the first detection signal, (ii) the second detection signals, and (iii) a third control signal.

20 Claims, 4 Drawing Sheets

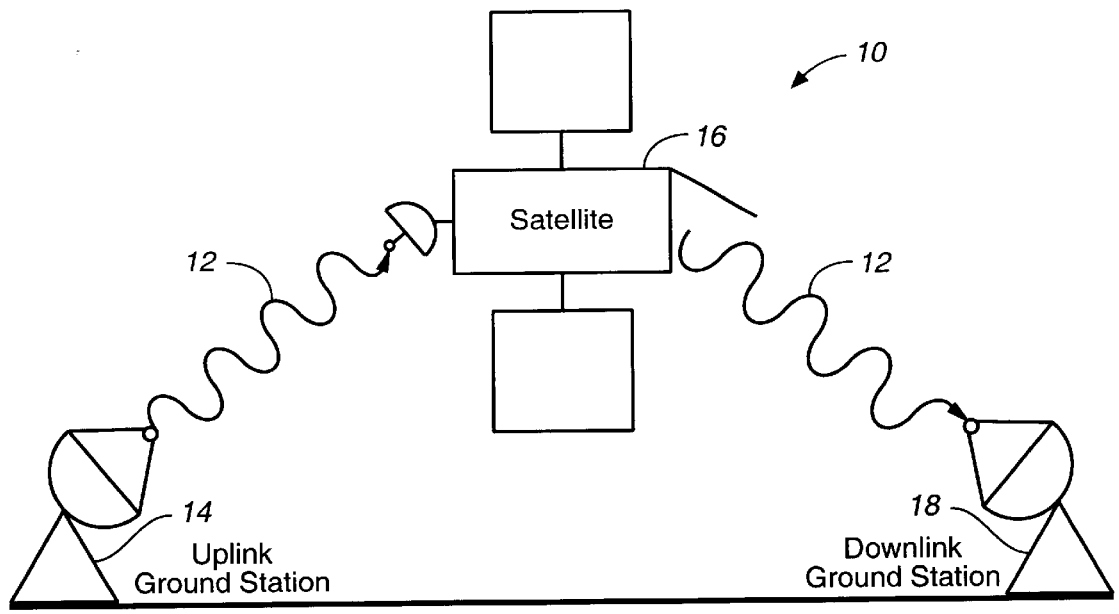
FIG._1
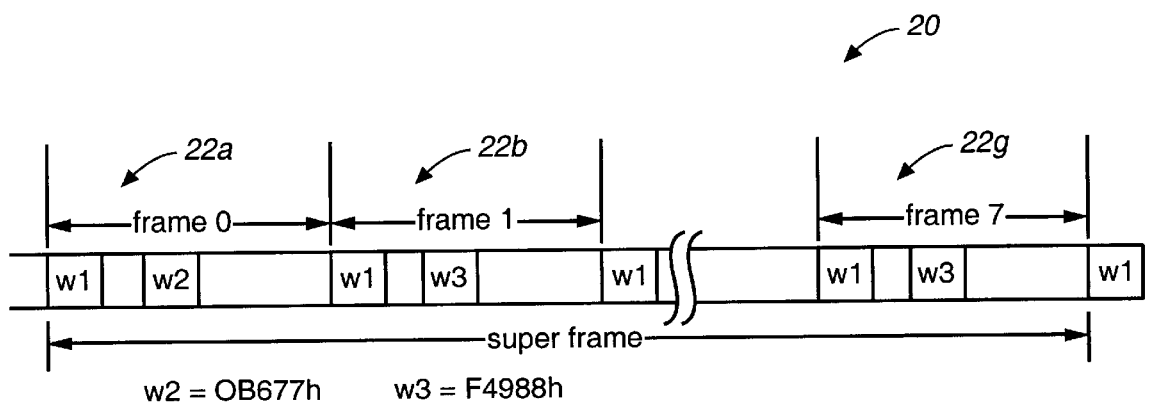
w2 = OB677h    w3 = F4988h
FIG._2

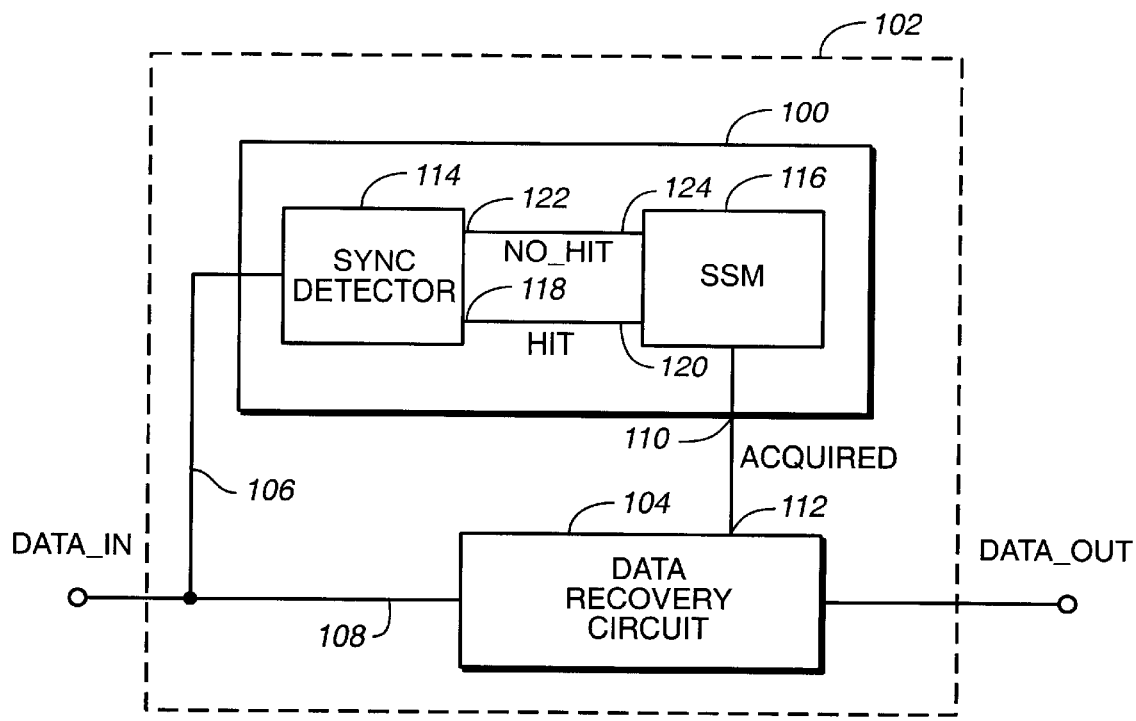
FIG._3
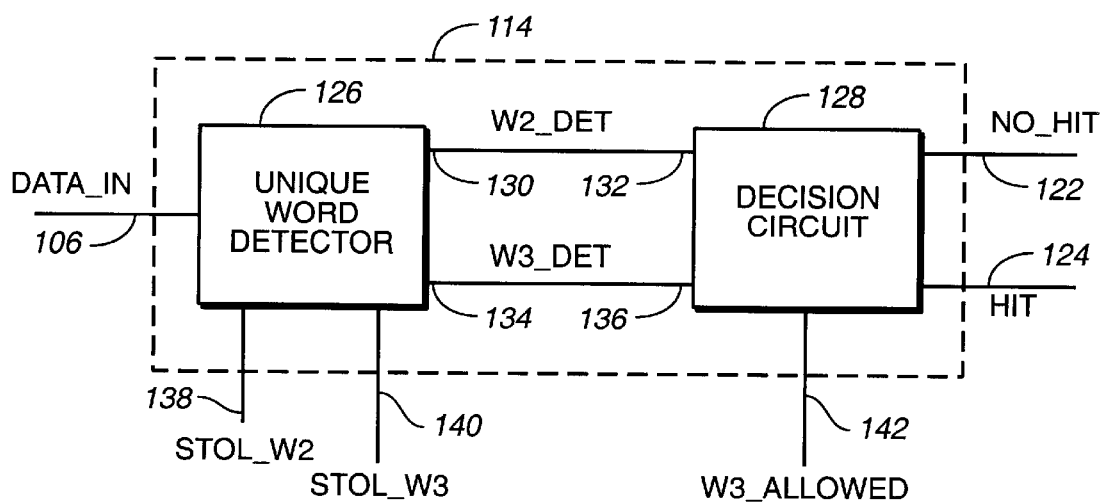
FIG._4

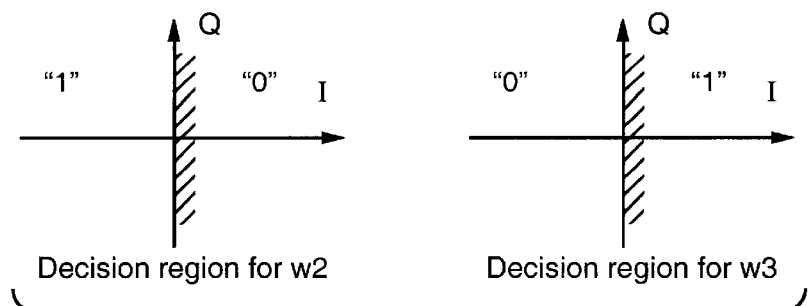
FIG._5
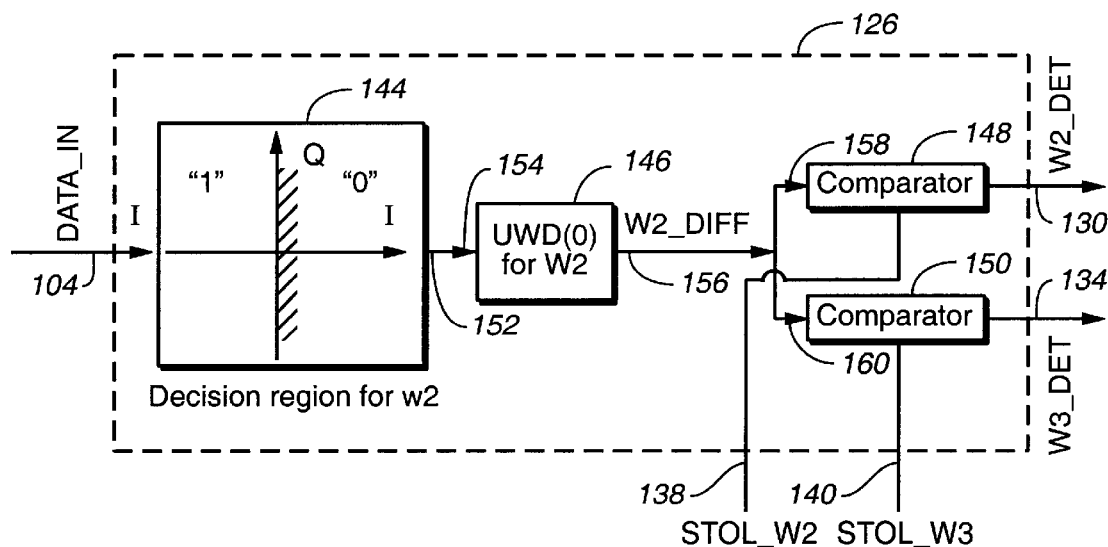
FIG._6
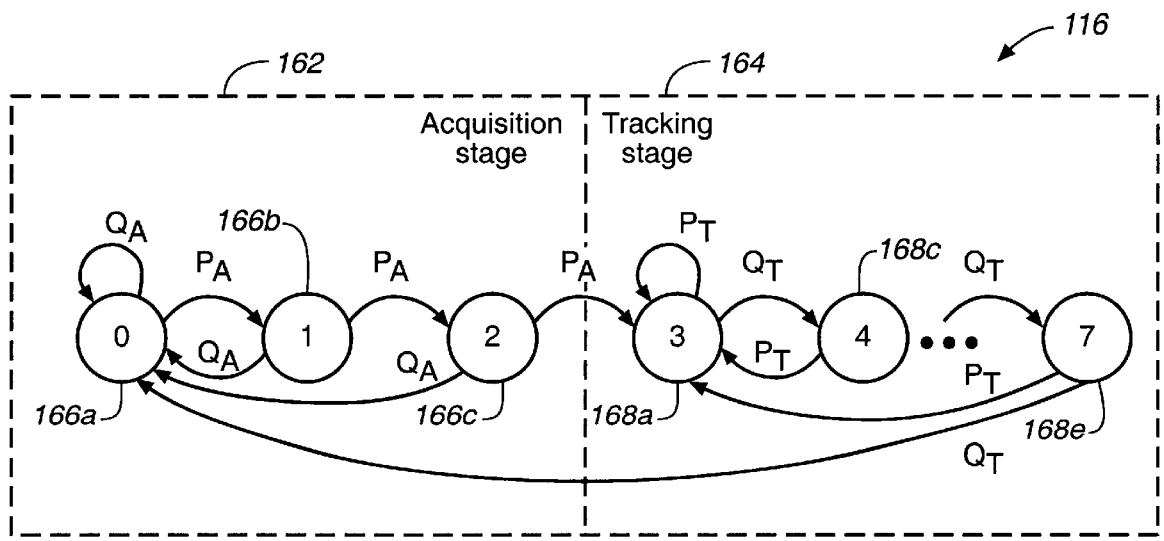
FIG._7

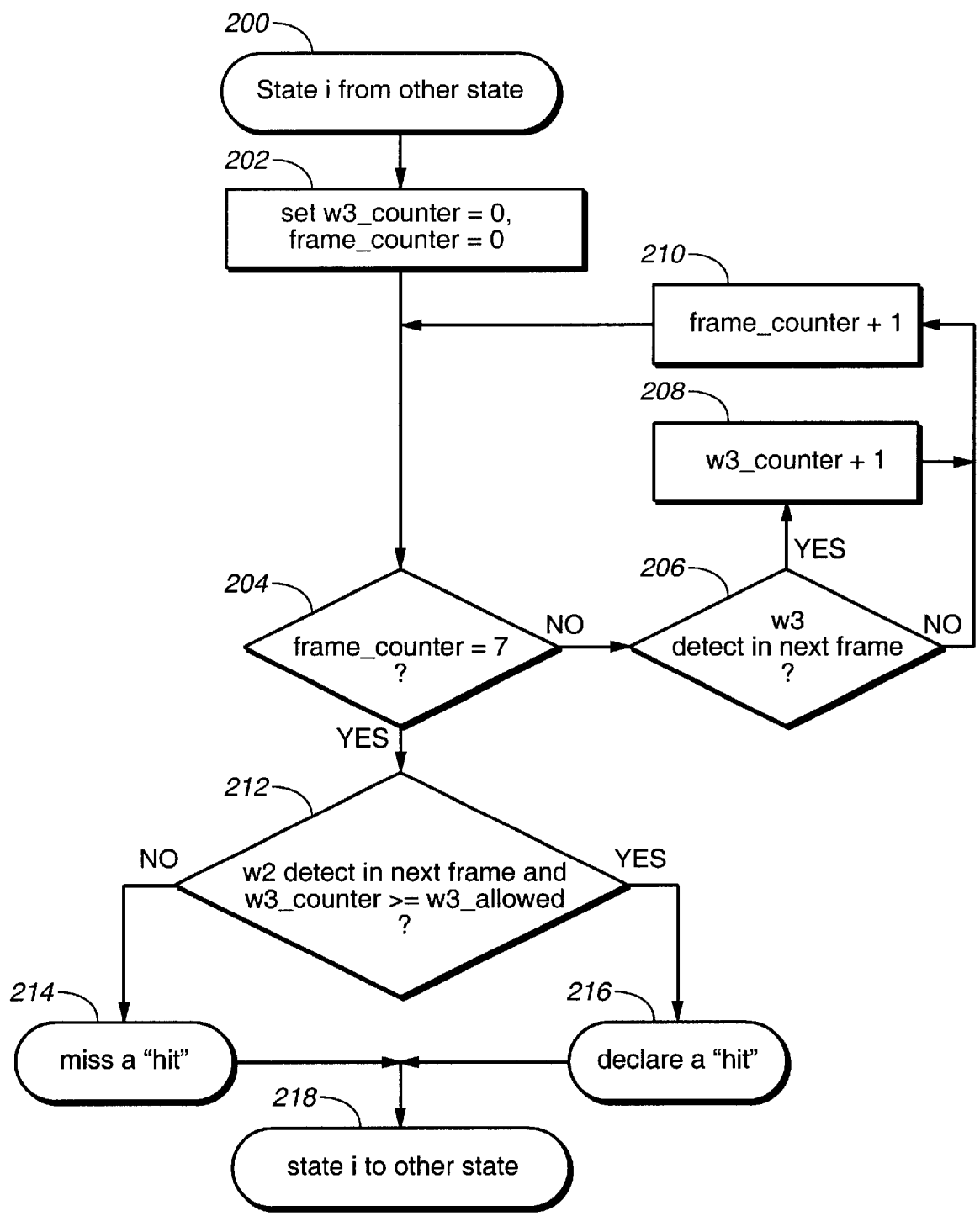
FIG._8

SYNCHRONIZATION OF SUPER FRAMES IN AN INTEGRATED SERVICES DIGITAL BROADCASTING FOR SATELLITES ISDB-S SYSTEM

FIELD OF THE INVENTION

The present invention relates to serial data communications generally and, more particularly, to a methodology for the synchronization of super frames in an integrated services digital broadcasting for satellites (ISDB-S) system.

BACKGROUND OF THE INVENTION

Data may be serially transmitted one bit at a time along a data transmission path. The serial data can be transmitted in groups of bits called frames. The frames are delimited by synchronization codes that identify the beginning or the end of each frame. The synchronization codes must be identified in the data stream before the significance of the data contained in the frame can be determined. When a synchronization code is identified, a signal can be generated to synchronize a data recovery circuit to the contents of the frame. The synchronization of the data recovery circuit to the frame is frame synchronization. The frames can be grouped into super frames. The synchronization of a super frame is super frame synchronization.

Referring to FIG. 1, a diagram of a satellite transmission system 10 illustrating a satellite data transmission path is shown. A data signal 12 is sent using electromagnetic waves from an uplink station 14 to a satellite 16. The data signal 12 can contain one or more integrated services digital broadcasting for satellites (ISDB-S) system super frames. The satellite 16 can recover the data from the data signal 12 and/or relay the data signal 12 using electromagnetic waves to a downlink ground station 18. The ground station 18 can recover the data from the data signal 12. Both the satellite 16 and the ground station 18 can use a data recovery circuit that is synchronized to the data signal 12 by a synchronization detector circuit. Since the data signal 12 is sent using electromagnetic waves, the data signal 12 can contain noise. A measurement of a power ratio between signal and noise acquired by the data signal 12 is the signal-to-noise ratio (SNR). As the SNR of the signal 12 decreases, synchronization and data recovery become more difficult.

Referring to FIG. 2, a diagram of an ISDB-S super frame 20 is shown. In an integrated services digital broadcasting for satellites (ISDB-S) system, frame structure is organized into super frames 20. Each super frame contains eight frames 22a–22g. Each frame has an embedded unique word W1 (e.g., ECD28h) in its header to identify the start of the frame 22. In addition, the first frame 22a of a super frame 20 has a unique word W2 (e.g., OB677h) in its header to identify the start of the super frame 20. Each of the subsequent seven frames 22b–22g have a unique word W3 (e.g., F4988h) in the same position as the unique word W2 in the first frame 22a. The unique words W2 and W3 are digital complements of each other (e.g., W2=!W3).

In a conventional method of super frame synchronization, a state machine is constructed based on the detection of only the unique word W2. The embedded unique words W3 are not used in super frame synchronization. Using only the unique word W2 to acquire super frame synchronization has the disadvantage of a high false lock probability, especially in a low signal-to-noise ratio (SNR) environment. Since the super frame is quite large, a high probability of false lock makes super frame synchronization based on a single unique word unreliable. A solution is needed to provide a reliable super frame synchronization.

SUMMARY OF THE INVENTION

The present invention concerns an apparatus comprising a first circuit and a second circuit. The first circuit may be configured to generate a first detection signal and a second detection signal in response to (i) an input signal, (ii) a first control signal, and (iii) a second control signal. The second circuit may be configured to generate a first output signal and a second output signal in response to (i) the first detection signal, (ii) the second detection signal, and (iii) a third control signal.

The objects, features and advantages of the present invention include providing a method of synchronizing super frames in an integrated services digital broadcasting for satellites (ISDB-S) system that may (i) reduce the probability of false locks, (ii) detect two unique words, (iii) use one detection region for detecting two unique words, (iv) use one unique word detector to detect two unique words, (v) adjust parameters in response to a signal-to-noise ration, and/or (vi) provide a more reliable frame synchronization.

BRIEF DESCRIPTION OF THE DRAWINGS

These and other objects, features and advantages of the present invention will be apparent from the following detailed description and the appended claims and drawings in which:

FIG. 1 is a diagram illustrating a satellite communication system;

FIG. 2 is a diagram illustrating an integrated services digital broadcasting for satellites (ISDB-S) system super frame;

FIG. 3 is a block diagram of a preferred embodiment of the present invention;

FIG. 4 is a more detailed block diagram of a synchronization detector of FIG. 3;

FIG. 5 is a diagram illustrating decision regions used for detecting unique words of the super frame of FIG. 2;

FIG. 6 is a more detailed block diagram illustrating a unique word detector of FIG. 4;

FIG. 7 is a state diagram illustrating a finite state machine for frame synchronization and super frame synchronization; and FIG. 8 is flow diagram illustrating a method according to the present invention for synchronizing super frames.

DETAILED DESCRIPTION OF THE PREFERRED EMBODIMENTS

Referring to FIG. 3, a block diagram of a circuit 100 illustrating a preferred embodiment of the present invention is shown. The circuit 100 may be implemented, in one example, as a super frame synchronization circuit. The circuit 100 is shown implemented as part of a serial data transmission receiver 102. The receiver circuit 102 may be configured to generate a recovered data signal (e.g., DATA_OUT) in response to a data input signal (e.g., DATA_IN). The signal DATA_IN may comprise, in one example, one or more integrated services digital broadcasting for satellites (ISDB-S) system super frames. The receiver 102 may further comprise a data recovery circuit 104. The signal DATA_IN may be presented to an input 106 of the circuit 100 and an input 108 of the circuit 104. The circuit 100 may have an output 110 that may present a control signal (e.g., ACQUIRED) to an input 112 of the data recovery circuit 104. The signal ACQUIRED may indicate that the circuit 100 has locked synchronization with the signal DATA_IN. The data recovery circuit 104 may be configured to generate the signal DATA_OUT in response to the signal DATA_IN and the signal ACQUIRED.

The circuit 100 may comprise a circuit 114 and a circuit 116. The circuit 114 may be implemented, in one example, as a synchronization code detector. The circuit 116 may be implemented, in one example, as a synchronization state machine (SSM). The circuit 114 may have (i) an output 118 that may present a first detection signal (e.g., HIT) to an input 120 of the circuit 116 and (ii) an output 122 that may present a. second detection signal (e.g., NO_HIT) to an input 124 of the circuit 116 in response to the signal DATA_IN. The signal HIT may indicate, in one example, that a synchronization signal (or event) has been detected. The signal NO_HIT may indicate, in one example, that a synchronization signal (or event) has not been detected. The circuit 116 may be configured, in one example, to generate the signal ACQUIRED in response to the signals HIT and NO_HIT.

Referring to FIG. 4, a more detailed block diagram of the circuit 114 is shown. The circuit 114 may comprise a circuit 126 and a circuit 128. The circuit 126 may be implemented, in one example, as a unique word detector circuit. The circuit 128 may be implemented, in one example, as a decision circuit. The signal DATA_IN may be presented to the circuit 126. The circuit 126 may have (i) an output 130 that may present a first detection signal (e.g., W2_DET) to an input 132 of the circuit 128 and (ii) an output 134 that may present a second detection signal (e.g., W3_DET) to an input 136 of the circuit 128. The circuit 126 may be configured to generate the signals W2_DET and W3_DET in response to detecting the unique words W2 and W3, respectively, in the signal DATA_IN. The circuit 126 may be configured to employ a tolerance parameter when detecting each of the unique words. The tolerance parameters may be predetermined or the circuit 126 may have (i) an input 138 that may receive a control signal (e.g., STOL_W2) and (ii) an input 140 that may receive a control signal (e.g., STOL_W3). The signal STOL_W2 may be used, in one example, to set the tolerance parameter for detecting the unique word W2. Similarly, the signal STOL_W3 may be used to set the tolerance parameter for detecting the unique word W3.

The circuit 128 may be configured, in one example, to generate the signals HIT and NO_HIT in response to the signals W2_DET and W3_DET. The circuit 128 may be configured to use a tolerance parameter when deciding whether to generate the signal HIT or the signal NO_HIT. The tolerance parameter may be predetermined or, in one example, the circuit 128 may have an input 142 that may receive a control signal (e.g., W3_ALLOWED) that may be used to set the tolerance parameter. The number of W3s detected between two w2s may be set by the signal W3_ALLOWED in response to the signal to noise ratio (SNR) of a channel. At high SNR, more W3s (e.g., up to seven) may be detected, while at lower SNR fewer W3s may be detected. The tolerance parameter may give the receiver more flexibility in acquiring super frame synchronization in different channel environments.

Referring to FIG. 5, a diagram illustrating hard decision regions for the unique words W2 and W3 is shown. Since W2 and W3 are complementary to each other (e.g., W2=!W3) and are generally binary modulated (BPSK) symbols, the same unique word detection circuit may be used for both W2 and W3. However, each unique word will generally have a different decision boundary.

To detect the unique words W2 and W3, a hard decision is used to decide a "0" or "1" pattern of the input symbols. The pattern may then be matched with the known unique embedded words W2 and W3. A general assumption is that both the frequency deviation and absolute phase rotation for the signal DATA_IN are zero. if the input symbol falls in the right half plane, a logical "0" is decided for the embedded word W2 decision. Otherwise, a logical "1" is decided for the embedded word W2 decision. For the embedded word W3, the decision is inverse to that of the embedded word W2.

Referring to FIG. 6, a more detailed block diagram of the circuit 126 is shown. The circuit 126 may comprise, in one example, a hard decision block 144, a unique word detector 146, a comparator 148, and a comparator 150. The signal DATA_IN may be presented to an input of the hard decision block 144. The hard decision block 144 may have an output 152 that may present a series of logical "0"s and "1"s to an input 154 of the unique word detector 146. The unique word detector 146 may be configured to detect the unique word W2 in response to the series of logical "0"s and "1"s. The unique word detector 146 may have an output 156 that may present a signal (e.g., W2_DIFF) to (i) an input 158 of the comparator 148 and (ii) an input 160 of the comparator 150. The signal W2_DIFF may represent a Hamming distance between the received symbols and the unique word W2. If the received symbol perfectly matches the word W2, the signal W2_DIFF will generally have a value of zero. If the received symbol perfectly matches the word W3, the signal W2_DIFF will generally have, in an example where the words W2 and W3 have twenty bits, the value twenty. The comparators 148 and 150 may be configured, in one example, to generate the signals W2_DET and W3_DET, respectively, in response to the signal W2_DIFF.

Noise on the signal DATA_IN may make it difficult to detect the words W2 and W3. The word detector 126 may be configured to compensate for noise by detecting the words W2 and W3 with less than a perfect match. For example, in the example where the word W2 has 20 bits, the word detector 126 may be configured to generate the signal W2_DET in response to detecting seventeen of the twenty bits. The three bit error may represent a noise tolerance of the word detector 126 for the word W2. Similarly, the word detector 126 may generate the signal W3 DET in response to detecting fewer than the twenty bits of W3.

A Hamming distance between the received symbols and the words W2 and W3 may be calculated using the respective tolerances. For example, the following formula may be used to calculate the Hamming distance for the word W2:

$$d_H = \sum_{i=0}^{19} (r_i \oplus w2, i), d_H \leq STOL_{W2}$$

The Hamming distance may be used in generating the signals W2_DET and W3_DET. For example, if the Hamming distance between the received symbols and W2 is less than or equal to the STOL for the word W2 (e.g., $d_H = (r_i \oplus w_{2,i})$, $d_H \leq STOL_{W2}$), the signal W2_DET may be generated. Since the unique word detector 146 is generally configured for the word W2, and W3 is a digital complement of the word W2, a perfect mismatch with the word W2 will generally indicate detection of the word W3. If the Hamming distance between the received symbols and W2 is greater than or equal to the STOL for the word W3 (e.g., $d_H \geq (20-STOL_{W3})$), the signal W3_DET may be generated.

The comparators 148 and 150 may be configured, in one example, to use a preset tolerance parameter to generate the signal W2_DET and W3_DET, respectively. In another example, the comparator 148 may be configured to set a tolerance parameter for the word W2 in response to the signal STOL_W2. Similarly, the comparator 150 may be configured to set a tolerance parameter for the word W3 in response to the signal STOL_W3.

By using the complementary relationship between the word W2 and the word W3, one unique word detector may be used for both W2 and W3 detection. Since the circuit 100 generally may use only one extra comparator to detect both W2 and W3 for super frame synchronization, any increase in hardware cost will generally be minor.

Referring to FIG. 7, a state diagram illustrating an operation topology of the synchronization state machine (SSM) 116 is shown. The synchronization state machine 116 may be implemented, in one example, as a finite state machine for frame synchronization. The synchronization state machine 116 may have an acquisition stage 162 and a tracking stage 164. The acquisition stage 162 may have, in one example, three states 166a–166c. However, any number of states may be implemented to meet the design criteria of a particular application. When the signal HIT is received, the acquisition stage generally moves forward one state (e.g., the arrows marked $P_A$). When signal NO_HIT is received, the acquisition stage generally moves back to the first acquisition state 166a (e.g., the arrows marked $Q_A$)). Each time the signal NO_HIT is received, the acquisition process generally starts over. In order for the synchronization state machine 116 to consider the signal DATA_IN acquired, three "hits" must occur in a row (e.g., a number equal to the number of states in the acquisition stage) The tracking stage 164 may use, in one example, the same topology as the acquisition stage. The tracking stage may have, in one example, five states 168a–168e. However, any number of states may be implemented to meet the design criteria of a particular application. When the signal HIT is received during tracking, the tracking phase generally moves backward to the first tracking state 168a (e.g., the arrows marked $P_T$). When the signal NO_HIT is received during tracking, the tracking stage generally moves forward one state (e.g., the arrows marked $Q_T$) The tracking states 168a–168e may include generating the signal ACQUIRED.

The synchronization state machine 116 may be implemented using other topologies accordingly to meet the design criteria of a particular application. For example, the present invention may be implemented along with one or more portions of U.S. Ser. No. 09/480,220, filed on Jan. 10, 2000, which is hereby incorporated by reference in its entirety.

Referring to FIG. 8, a flow diagram illustrating a process for generating the signals HIT and NO_HIT is shown. When the state machine 116 moves from a previous state to a current state (e.g., i) as shown in block 200, a frame count (e.g., FRAME_COUNTER) and a unique word count (e.g., W3_COUNTER) are generally set to zero (e.g., block 202). As long as FRAME_COUNTER is not equal to seven (e.g., block 204), a search is generally performed for the unique word W3 (e.g., block 206). If the unique word W3 is detected, the value W3_COUNTER and the value FRAME_COUNTER are generally increased by one (e.g., blocks 208 and 210). If the unique word W3 is not detected, the value FRAME_COUNTER is generally incremented (e.g., block 210) and the value W3_COUNTER is generally unchanged. When the value FRAME_COUNTER is seven, a search for the unique word W2 is generally started (e.g., block 212). If the unique word W2 is detected in the next frame and the value W3_COUNTER is greater than or equal to a predetermined value (e.g., W3_ALLOWED), the signal HIT is generally asserted (e.g., block 214). If the unique word W2 is not detected in the next frame or the value W3_COUNTER is less than the predetermined value W3_ALLOWED, the signal NO-HIT is generally asserted (e.g., block 216). The synchronization state machine 116 will generally move to a different state in response to the declaration of a HIT or a NO-HIT, (e.g., block 218).

The function performed by the state machine 116 of FIG. 7 and/or the process described in the flow diagram of FIG. 8 may be implemented using a conventional general purpose digital computer programmed according to the teachings of the present specification, as will be apparent to those skilled in the relevant art(s) Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, and magneto-optical disks, ROMs, RAMs, EPROMs, EEPROMs, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the spirit and scope of the invention.

What is claimed is:

1. An apparatus for synchronizing a super frame in an integrated services digital broadcasting for satellite system, comprising:
    a first circuit configured to generate a first detection signal and a second detection signal in response to (i) an input signal, (ii) a first control signal, and (iii) a second control signal; and
    a second circuit configured to generate a first output signal and a second output signal in response to (i) said first detection signal, (ii) said second detection signal, and (iii) a third control signal.

2. The apparatus according to claim 1, wherein said first detection signal is generated in response to a first unique word being detected in said input signal.

3. The apparatus according to claim 2, wherein said first control signal determines an allowable error in detecting said first unique word.

4. The apparatus according to claim 1, wherein said second detection signal is generated in response to a second unique word being detected in said input signal.

5. The apparatus according to claim 4, wherein said second control signal determines an allowable error in detecting said second unique word.

6. The apparatus according to claim 1, wherein said first circuit comprises a unique word detector.

7. The apparatus according to claim 1, wherein said third control signal determines a number of times said second unique word is detected between detections of said first unique word.

8. The apparatus according to claim 1, wherein said first and said second control signals are set to a predetermined value.

9. The apparatus according to claim 1, wherein said first and said second control signals are generated in response to a signal-to noise ratio of said input signal.

10. The apparatus according to claim 1, wherein said first and said second detection signals are generated using a Hamming distance.

11. The apparatus according to claim 1, wherein said first circuit comprises a single unique word detector.

12. The apparatus according to claim 1, wherein:

said first detection signal is generated in response to detecting a unique word in said input signal; and said second detection signal is generated in response to detecting a complement of said unique word in said input signal.

13. The apparatus according to claim 1, wherein said first circuit comprises:

a unique word detector configured to generate an intermediate signal representing a hamming distance between a symbol in said input signal and a known unique word;

a first comparator configured to generate said first detection signal in response to said intermediate signal and said first control signal; and a second comparator configured to generate said second detection signal in response to said intermediate signal and said second control signal.

14. The apparatus according to claim 1, further comprising:

a third circuit configured to generate a third output signal indicative of a synchronization state of said apparatus in response to said first output signal and said second output signal.

15. The apparatus according to claim 14, wherein said third circuit comprises a synchronization state machine.

16. An apparatus for synchronizing a super frame in an integrated services digital broadcasting for satellite system, comprising:

means for generating a first detection signal and a second detection signal in response to (i) an input signal, (ii) a first control signal, and (iii) a second control signal; and means for generating a first output signal and a second output signal in response to (i) said first detection signal, (ii) said second detection signal, and (iii) a third control signal.

17. A method of synchronizing a super frame in an integrated services digital broadcasting for satellite system comprising the steps of:

(A) generating a first detection signal and a second detection signal in response to (i) an input signal, (ii) a first control signal, and (iii) a second control signal; and (B) generating a first output signal and a second output signal in response to (i) said first detection signal, (ii) said second detection signal, and (iii) a third control signal.

18. The method according to claim 17, wherein step (A) comprises the sub-steps of:

(A-1) setting a first tolerance value in response to said first control signal;

(A-2) setting a second tolerance value in response to said second control signal;

(A-3) determining a pattern of "0"s and "1"s for a said input signal;

(A-4) comparing said pattern to a known unique word to generate a value representative of a degree of match;

(A-5) generating said first detection signal if said degree of match value is less than or equal to said first tolerance value; and (A-6) generating said second detection signal if said degree of match value is greater than or equal to a number of bits in a second unique word less said second tolerance value.

19. The method according to claim 18, wherein said degree of match value comprises a Hamming distance.

20. The method according to claim 17, further comprising the steps of:

changing a state in response to (i) detecting a number of first frames containing a known unique word and detecting a subsequent second frame containing a complement of said known unique word, wherein said number of first frames is set in response to said third control signal.

* * * * *